INVENTORS
Charles C. Rayburn
James G. Black, Jr.

July 23, 1968   J. G. BLACK, JR., ET AL   3,394,239
METHOD AND APPARATUS FOR ASSEMBLING CAPACITORS
Filed March 22, 1965   9 Sheets-Sheet 5

INVENTORS
Charles C. Rayburn
James G. Black, Jr.
BY
Their Att'ys

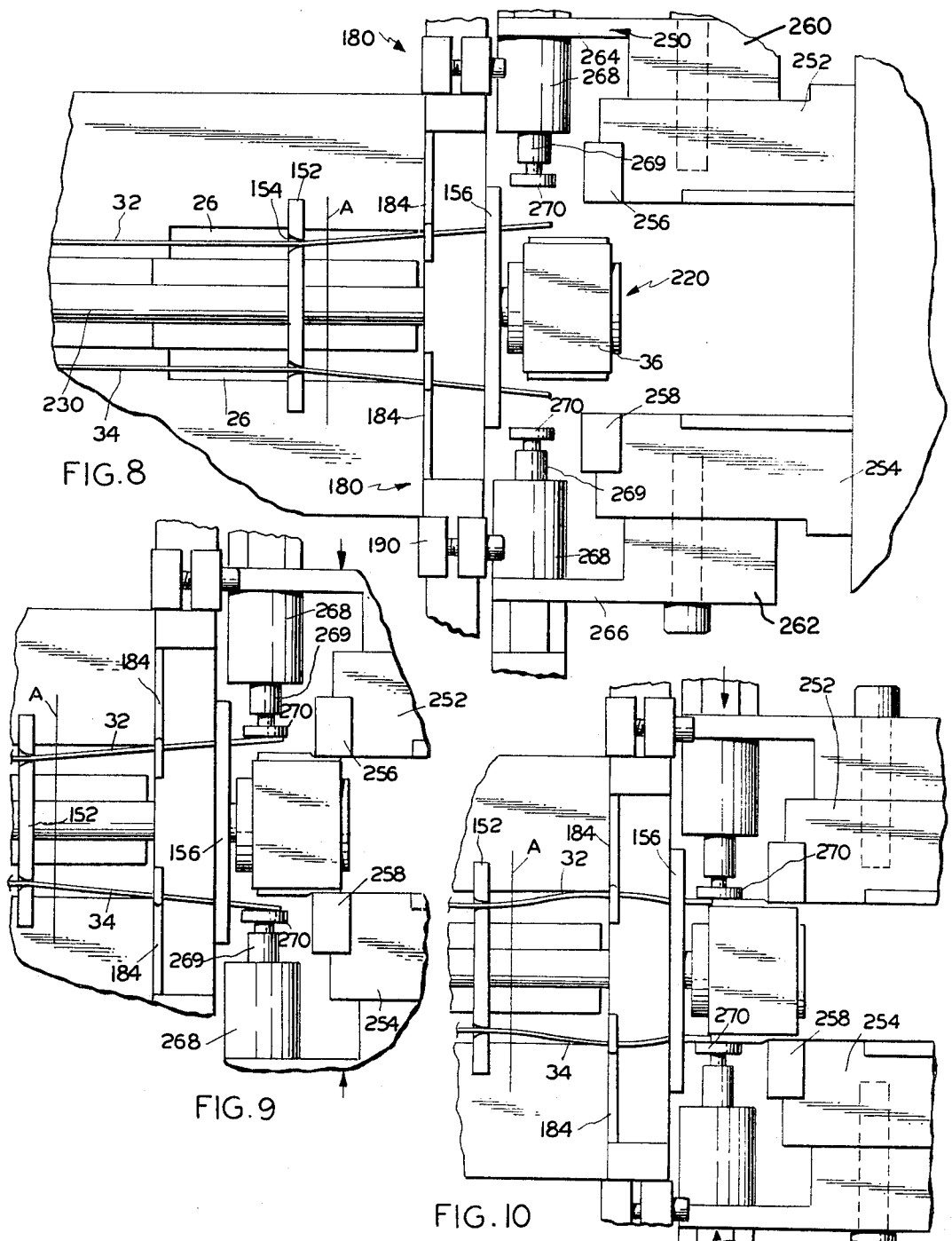

United States Patent Office 3,394,239
Patented July 23, 1968

3,394,239
METHOD AND APPARATUS FOR ASSEMBLING CAPACITORS
James G. Black, Jr., Springfield, and Charles C. Rayburn, Falls Church, Va., assignors to Illinois Tool Works Inc., Chicago, Ill., a corporation of Delaware
Filed Mar. 22, 1965, Ser. No. 441,774
10 Claims. (Cl. 219—95)

ABSTRACT OF THE DISCLOSURE

Method and apparatus for automatically assembling lead wires to exposed metal foil ends of capacitors utilizing percussive welding techniques, wherein wound capacitor blanks are supported at an assembly station by a base and flange which are adjustable to accommodate different size blanks. Spaced lead wires are intermittently fed from a supply reel and held spaced from the metallic ends of the blank, a welding voltage is impressed between the wires and ends, and the ends of the wires are forcibly brought into contact. The wires are then severed.

---

The present invention deals with a method and apparatus for assembling electrical components, and more particularly, to a percussive welding method and apparatus for assembling lead wires to convolutely wound film capacitors.

Convolutely wound capacitors with assembled leads are used by industry in large numbers. The steps involved in the fabrication of capacitors of this type require first the winding of strips or tapes of conductive material into a tight coil, the strips or tapes either being entirely metal or a dielectric material provided with a conductive coating. It is important that the conductive strips or tapes be insulated from each other, and to effectuate this, it is common practice to wind two or more conductive tapes together with paper, plastic or other dielectric materials, also preferably in tape or strip form, positioned therebetween. After the capacitor body or blank has been thus formed, lead wires are assembled to each end of the wound capacitor to form the ultimately desired article.

Much of the difficulty in fabricating capacitors of the above described type has centered around the technique of assembling or attaching the leads to the capacitor body or blank. In the usual case, the conductive tapes are wound in a staggered arrangement so as to provide opposed extending edges of the conductive tapes at each end of the capacitor body or blank to which leads are secured by soldering. The disadvantages with this approach include not only a weak joint or connection between the leads and the capacitor which requires care in handling to prevent separation, but manufacturing costs are relatively high. In attempting to eliminate some of the manufacturing costs, aluminum instead of tin-lead foil has been employed since aluminum foil is quite a bit cheaper, but this increases the difficulty of soldering.

A slightly different approach which eliminates the aforementioned difficulties has recently been developed, and this includes the heating of the leads to a sufficiently high temperature and placement of the leads against the dielectric material, which preferably extends beyond the conductive tapes or strips, so that it fuses into a solid portion locking the lead within the edge of the capacitor coil and tightly against the edge of the conductive tape or strip. Although this most recent approach has been extremely satisfactory, there is still a need to provide an effective method for assembling leads to the exposed or extended conductive edge surfaces of a wound capacitor, especially in the case of dipped or coated capacitors where the need for a strong physical bond between the lead wires and capacitor body is not as great, although the bond must be of adequate strength. In addition, the direct attachment of lead wires to the extended metallic foil of a wound capacitor eliminates any difficulties in making an electrical connection therebetween. We have found that percussive welding techniques can be readily adapted to low cost, high speed mechanized assembly of leads to the extended conductive foil of a convolutely wound capacitor, and thus the present invention deals with a method and apparatus employing percussive welding techniques for assembling capacitors.

By definition, percussive welding is defined as a resistance welding process in which an intense discharge of electrical energy between two metals occurs to create an electrical arc slightly before impacting the metals together in the vicinity of the arc. The arc is extinguished by the percussion blow of the two parts coming together with sufficient force to effect the weld. The energy for the discharge is built up in one of two ways. In the electrostatic method, energy is stored in a capacitor, and the parts to be welded are heated by the sudden discharge of a heavy current from the capacitor. The electromagnetic process uses the energy discharge which is created by collapsing a magnetic field linking the primary and secondary windings of a transformer or other inductive device. In either cases intense arcing is created, which is followed by a quick blow to make the weld.

Energy dissipated in the arc results in increasing the average molecular kinetic energy of adjacent metallic surfaces desired to be welded. In effect, the participating surfaces of the parts to be welded are heated above the melting points of the materials as they approach each other, and then are driven in an impacting relationship. The surfaces are instantly boiled together, and solidify upon cooling. The action of this process is so rapid that there is little heating effect in the material adjacent to the weld. Only within a few thousandths of an inch of the arc surfaces is there any significant temperature elevation. In a capacitor, for example, having leads assembled by this process, there is less than 10° C. temperature rise in the dielectric material resulting from heat generated at the arc.

The rate at which the metal surfaces approach each other is important. The arc forms when the voltage gradient reaches about 70,000 volts per inch. If the energy source is charged to 35 volts, the arc is formed when there is a one-half mil separation. Only when the arc forms is the approach rate important. If the rate is too slow, the arc forms, the heat is generated, but the heat is lost by conduction before the surfaces are pressed together. If the approach rate is too rapid, insufficient time is allowed for the energy to dissipate in the arc and consequently the required surface temperature is not attained.

The above mentioned and other factors must be considered in employing the percussive welding technique as part of a high speed, mechanized system. The disposition of the lead wires at the proper time and location relative to the capacitor body is extremely critical in adapting the percussive welding technique to a mechanized process.

Accordingly, it is an object of the present invention to provide a new and improved method and apparatus for automatically securing lead wires to extended metallic foil end surfaces of a convolutely wound capacitor in a continuous manner.

Another object of the present invention is the provision of a new and improved method and apparatus for percussively welding leads to electrical components such as capacitors and the like.

Still another object of the present invention is the provision of a new and improved method and apparatus adapting percussive welding techniques for continuous and repetitive manufacture of capacitors, particularly of the radial lead variety.

A further object of the present invention is the provision of a new and improved mechanism for feeding elongated wire strips to an assembly station where they are cut to predetermined lengths either before or after assembly to a capacitor blank in a fast and efficient manner, and then transferred to an article receiving station.

Still a further object of the present invention is the provision of a new and improved mechanism for dereeling elongated wire strips from supply rolls which is simple, inexpensive, requires less maintenance and is easier to load and unload than prior art devices.
ribont whitvbgkq Yet another object of the present invention is the provision of a new and improved mechanism which reduces the effects of variable tension in the feeding of elongated wire strips.

A still further object of the present invention is the provision of a new and improved mechanism which automatically grips, holds and positions lead wires relative to a capacitor body or blank to facilitate percussive welding thereof without deforming the lead wires.

Still another object of the present invention is the provision of a new and improved mechanism which will accommodate and support capacitors of different size without changing the center line location thereof relative to lead wires disposed adjacent thereto.

Other and further objects and advantages of the present invention will become apparent from the following description when taken in conjunction with the accompanying drawings wherein:

FIGS. 8–12 are sequential views showing the manner in which elongated wire strips are fed to an assembly station assembled to a capacitor body or blank and cut into predetermined lengths;

Figure 1:
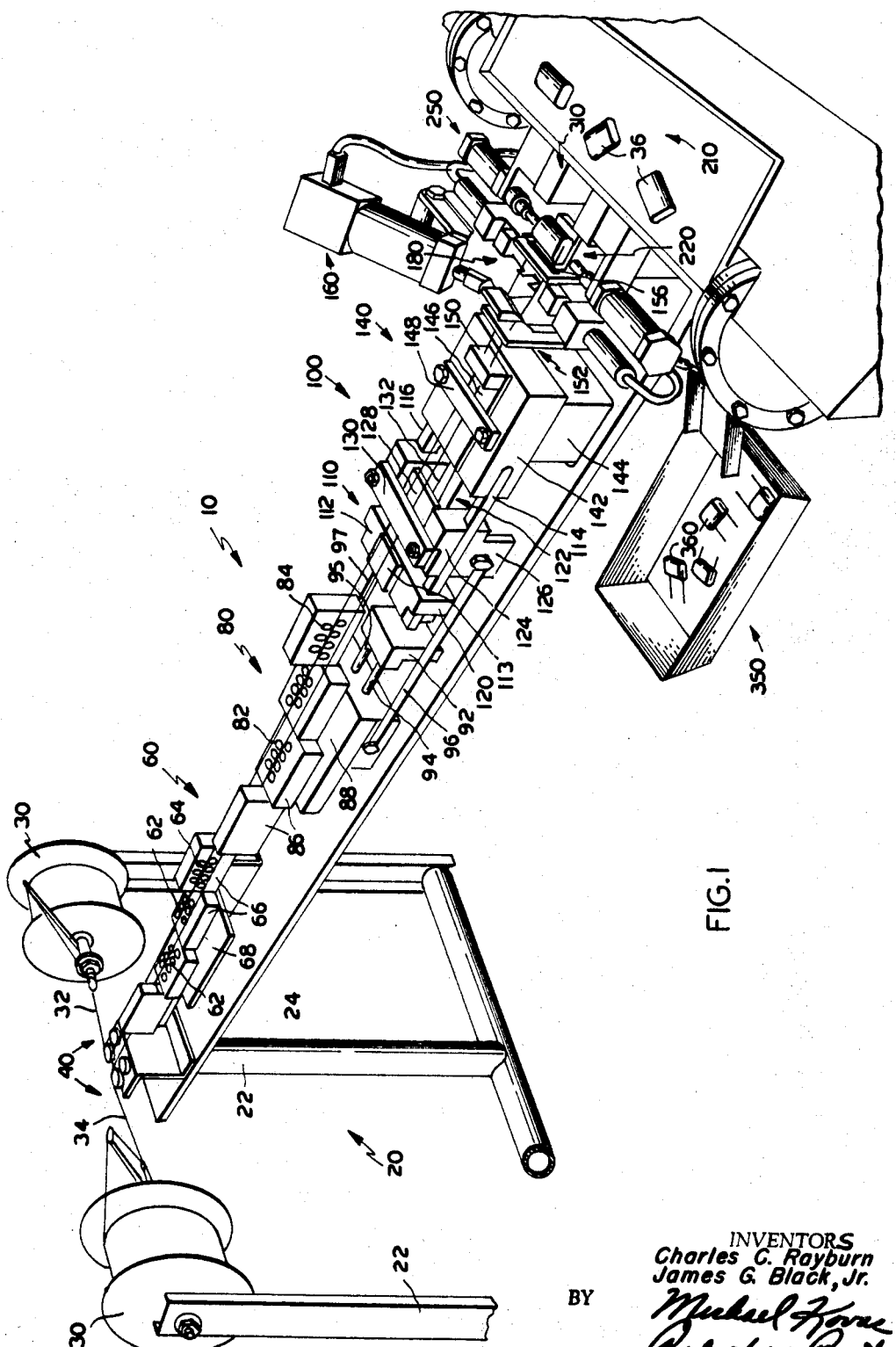
FIG. 1 is a perspective view of a semi-automatic apparatus for assembling lead wires to capacitor bodies constructed in accordance with the present invention.

Before giving a detailed description of the present invention, it is believed that a general description and operation of the major components of the apparatus would be beneficial. Attention is first directed to FIG. 1 showing the apparatus 10 which incorporates the principles of the present invention. The apparatus 10 includes suitable frame or support means 20 which positions the operating mechanisms of the apparatus a suitable distance above the floor. Beginning at the left-hand side of FIG. 1, the apparatus is shown as comprising a pair of supply reels or drums 30 on opposite sides of the apparatus supporting bed or table 24 about which elongated wire strip or stock is wound. The wire stock is preferably of the tinned-copper variety, although other metals may be used depending upon their welding capability. The wire stock issuing from the pair of supply rolls is identified by numerals 32, 34, and is first dispensed or fed through suitable dereeling apparatus 40 which aids in unwinding the wires from their spools or drums 30 and directing the wires along predetermined paths substantially normal to the axis of the spools or drums. After passing through the dereeling mechanism 40, the wires 32, 34 are fed through a fixed wire straightener device 60 and a movable wire straightener device 80, the latter being attached to a reciprocating feed carriage 100 for purposes to be described hereinafter. The feed cariage 100 is reciprocated in a direction parallel to the axis of the wires 32, 34 and is provided with a feed clamp section 110 which grips the wires at or slightly before the beginning of its forward stroke so that the wires 32, 34 will be carried with the feed carriage 100 when moved from its rearward position. The feed carriage 100 is also provided with a stock clamp section 140 which engages the wires 32, 34 when the feed carriage 100 has completed its forward stroke so as to maintain the wires in suitable locations for a cutting operation performed thereafter.

The reciprocating feed carriage 100 transports predetermined lengths of wire through the rear wire guide 152, past a cutter mechanism 160 and then through the forward wire guides 156 so as to dispose end portions thereof adjacent the extended metallic foils of a convolutely wound capacitor blank 36 held in position by the capacitor support assembly 220 at the welding or assembly station 250. Individual capacitor bodies or blanks 36 are supported by the table 210 at the extreme right of the machine, and are individually loaded or placed upon the capacitor support assembly 220 preferably after each incremental feeding of the wires 32, 34.

The cutter mechanism 160 severs predetermined lead lengths 38 from the wires 32, 34 preferably after the forward end portions thereof have been attached to the capacitor body or blank 36 at the assembly station 250 by percussive welding techniques to be described in detail hereinafter. After the leads 38 are assembled to the capacitor body or blank 36, the capacitor support assembly 220, which is linked to the feed carriage 100, transports the capacitor with its assembled leads to a tamping station 310 where the foils surrounding the attached leads are tamped. The completed article is then transferred to gravity chutes 330, 332 (See FIG. 3) for movement to the product receiving tray 350. The completed capacitor 360 can then be carried by hand or suitable conveying apparatus to a coating station (not shown) where a protective coating of dielectric material is applied to the capacitor body and the lead portions in engagement therewith.

A detailed description of the construction, placement and operation of the major components of the apparatus will now be given. The apparatus frame 20 includes suitable upright members 22 which support both the apparatus supporting bed or table 24 and the spools or drums 30 positioned on opposite sides thereof. It will be understood that the spools or drums 30 are pivotally mounted to the upright members 22, and are secured thereto in a manner presently to be described.

Figure 5:
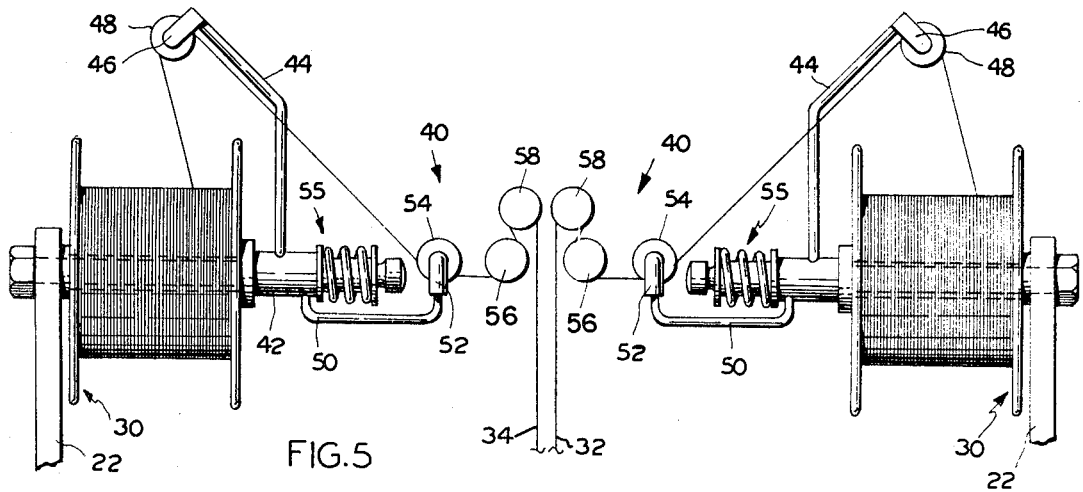
FIG. 5 is a top plan view of the unwinding mechanism shown at the extreme left side of the apparatus in FIG. 1.

The wires 32, 34 as they are withdrawn from their respective spools by the reciprocating feed carriage 100, pass first through the wire dereeling mechanism 40, the specific construction of which is shown in FIG. 5 of the drawings. The spools or drums 30 are provided with identical wire dereeling mechanisms 40, and thus a description of one wire dereeling mechanism will suffice, it being understood that the other has the same construction and operation.

Each of the wire spools or drums 30 is provided with what is referred to as a "spinning dereeler" which has a shaft 42 extending through the bore of each spool or drum 30 and is secured by suitable fastening means to one of the upright members 22. The dimensional relationships between the outer diameter of the shaft 42 and the bore of the spool or drum 30 is such that the spool or drum is capable of freely rotating on the shaft 42 without interruption. When the spool 30 is mounted upon the shaft 42, it is prevented from moving axially along the shaft 42 since the shaft 42 is provided with suitable abutments engaging the spool at one end, and one of the upright support members 22 engages the other end of the spool. A substantially L-shaped arm 44 has one end thereof assembled to the shaft intermediate its ends and the other end has a sheath support 46 which rotatably mounts a first guide roller 48. Mounted in generally opposed relation to the L-shaped arm 44 is a U-shaped bracket arm 50, one end of which is secured to the shaft 42 by suitable means, and the other end also having a sheath support 52 which rotatably mounts a second guide roller 54. Thus, wire wound about the spools or drums 30 is first entrained about the first guide roller 48 and then about the second guide roller 54 so that the wire is peeled off from the spool first in a direction generally normal to the spool axis, then diagonally thereto, and finally in alignment with the spool axis as it leaves the second guide roller 54.

Figure 2:
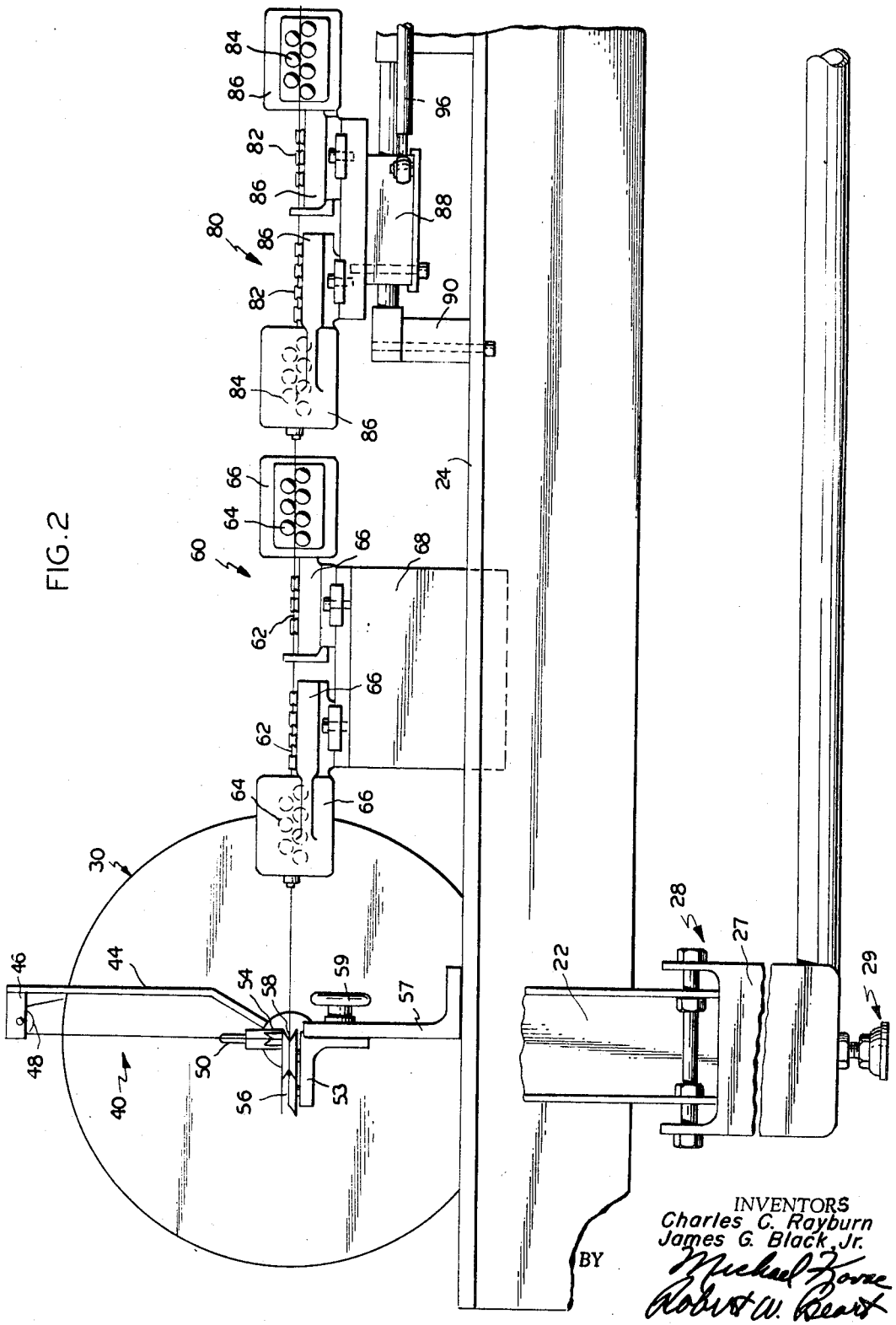
FIG. 2 is a fragmentary side elevational view of a portion of the apparatus shown in FIG. 1 as viewed along the left side thereof.

The arms 44, 50 of the dereeler assembly are releasably secured to the shaft 42 and held in predetermined positions by the dereeler adjuster nut and spring assembly 55. By loosening the adjuster nut and then moving the arms 44, 50 to desired positions, the tension maintained in the wires as they are withdrawn from the spools can be varied. It is also to be noted that the position of the spools can be varied by adjusting the horizontal and vertical positions of the upright member 22 associated with each spool. In FIG. 2, it is to be observed that the lower end of upright member 22 is positioned within hollow foot block 27 having upwardly directed legs which receives the adjustable fastener assembly 28, the latter also extending through the lower end portion of upright member 22. Lateral adjustment of upright member 22 is obtained by moving the nut members of the adjustable fasteners assemblies 28. Vertical movement or adjustment of the upright member 22 is possible by moving the nut members associated with adjustable foot assembly 29. Thus, each spool and its dereeling arrangement can be adjusted as desired.

The spool axes are positioned substantially horizontally to minimize the possibility of the wire becoming tangled as would occur with vertical axis dereeling. As an example, when a vertical dereeler rotates it relieves the coiled wire from the tension introduced when the spool is wound and this has a tendency to cause several of the spool coils to fall by gravity to the bottom of the spool where they may randomly lock by virtue of tumbling out of sequence and then being pulled across one another in a sort of close hitch knot as the dereeler continues to turn. These problems are eliminated with horizontally oriented spools.

However, withdrawing wire from the spools by the dereeling mechanism just described introduces a torsional force into the wire which increases the difficulty of straightening the wire, especially if roll type straighteners are used. In accordance with an important feature of the present invention, a pair of locking guide rollers 56, 58 are provided. As best seen in FIG. 2, these locking guide rollers are mounted on bracket arm 53 which is adjustably mounted to bracket plate 57, and secured in position on the supporting bed 24 by turning the adjusting knob 59. Torsion introduced by the dereeler mechanism is prevented from transferring through the locking guide rollers 56, 58 due to the counteracting effect of the forces applied to the wire in bending around the guide rollers. This is best seen in FIG. 5 where the wire withdrawn from the spool is entrained about the lower part of guide roller 56, then is directed between the guide rollers so as to be entrained about the upper part of guide roller 58, and is finally withdrawn from this last mentioned guide roller in a direction substantially normal to the spool axes by the reciprocating feed carriage 100. Guide rollers 56, 58 require the wires to traverse approximately 344° of arc so as to eliminate most of the torsion imparted to the wire by the dereeling mechanism.

It is important that the locking guide rollers 56, 58 be employed when using roll type straightener devices because of the manner in which they work the wire. As seen in FIGS. 1–2, the apparatus 10 of the present invention is provided with fixed and movable straightener devices 60, 80 respectively, both of which are preferably of the roll type. In the case of the fixed wire straightener device 60, it will be noted that there is provided for each wire generally horizontally and vertically disposed sets of rollers 62, 64 respectively. The rollers are rotatably mounted to suitable support blocks 66, the support blocks in turn being adjustably secured to a bracket support 68 which rests upon and is secured to the supporting bed 24 of the apparatus. It is to be noted that the support blocks 66 are arranged in pairs, and secured to each other in planes disposed 90° from each other. Each set of rollers is preferably seven in number, and are so arranged relative to adjacent rollers that guide grooves provided on their outer peripheral surfaces maintain the wire on a common center line. Wires fed through a set of horizontal and vertically disposed rollers will "work" the wires in planes displaced 90° from each other so as to produce generally straight wire providing that the wire does not rotate due to torsion. If torsion is present as the wire progresses through the roller system, the rollers will not "work" the wire consistently and predictably because the wire will rotate between successive rollers causing variations in wire straightness. The locking guide rollers 56, 58 eliminate most of the torsion before the wire enters the fixed or stationary wire straightener device 60, and the stationary straightener device itself serves to eliminate any remaining torsional force.

Although it might seem strange at first sight to use a dereeling mechanism such as the one described above where torsional forces are imparted to the wire which must be removed before moving the same through a straightener device, there are important reasons for adopting such a system. In repetitively dispensing a length of wire from a spool, variations are encountered in the amount of wire fed from a full to an empty spool. Without the dereeling arrangement of the present invention, this would require separate motors, bearings and shafts as well as rate and/or sensing equipment to start and stop the motors on demand. Such a system might use slack loops and dancer rolls actuating the motor control circuits, but as will be apparent, it would be more complex, expensive, require more maintenance and also be more difficult to load and unload than the dereeler arrangement of the present invention.

The dereeler mechanism together with the lock-off arrangement and the fixed or stationary straightener device will produce satisfactory straight wire, but there may be variations in wire tension due to the dynamics of the system. These variations may be caused wholly or in part by gravitational effects on the dereeler arms, variations due to the tension setting of the dereeler adjusting nut assembly, the effect of changing wire straightener settings, etc. Variations in wire tension could well produce kinks or other adverse formations in the wire after straightening which, of course, would be undesirable.

In order to divorce the wire from the effects of variable tension, a moving straightener device 80, also preferably of the roll type, has been provided which moves with the reciprocating feed carriage. As will be seen, the moving wire straightener 80 moves with the reciprocating feed carriage 100 so that the wires are maintained in predetermined paths, thus eliminating the effect of variable tension.

The moving wire straightener 80 is provided with horizontal and vertical sets of rollers 82, 84, also preferably seven in number, which are rotatably mounted to support blocks 86 in the same manner as the roller 62, 64 of the fixed or stationary straightener device 60. Similarly, adjacent horizontal and vertical support blocks 86 are secured to each other, the horizontally disposed support block in turn being adjustably secured to a movable ram carriage 88 which also functions as a support.

A pair of spaced vertical upright end portions 90, 92 are fixed relative to the supporting bed 24 and mount a par of spaced horizontal slide rods 94, 95 (See FIG. 1). The slide rods 94, 95 extend through the movable ram carriage 88 so as to permit sliding movement thereon between the upright end portions 90, 92. The movable ram carriage 88 is connected to the feed carriage by a pair of link members 96, 97 (See FIG. 1) which permit movement of the movable ram carriage 88, and thus the roll support blocks 86 which are mounted thereon as above described.

The significance of this particular arrangement is that the movable straightener device 80 will eliminate any variable tension in the wires 32, 34. When the reciprocating feed carriage moves forward on its feed stroke, the moving straightener device 80 will move with it to the forward feed limit. On the rear stroke of the reciprocating feed carriage 100, the moving wire straightener device 80 will be pushed back over the wires straightening them if necessary, and thus eliminating any variable tension.

Figure 3:
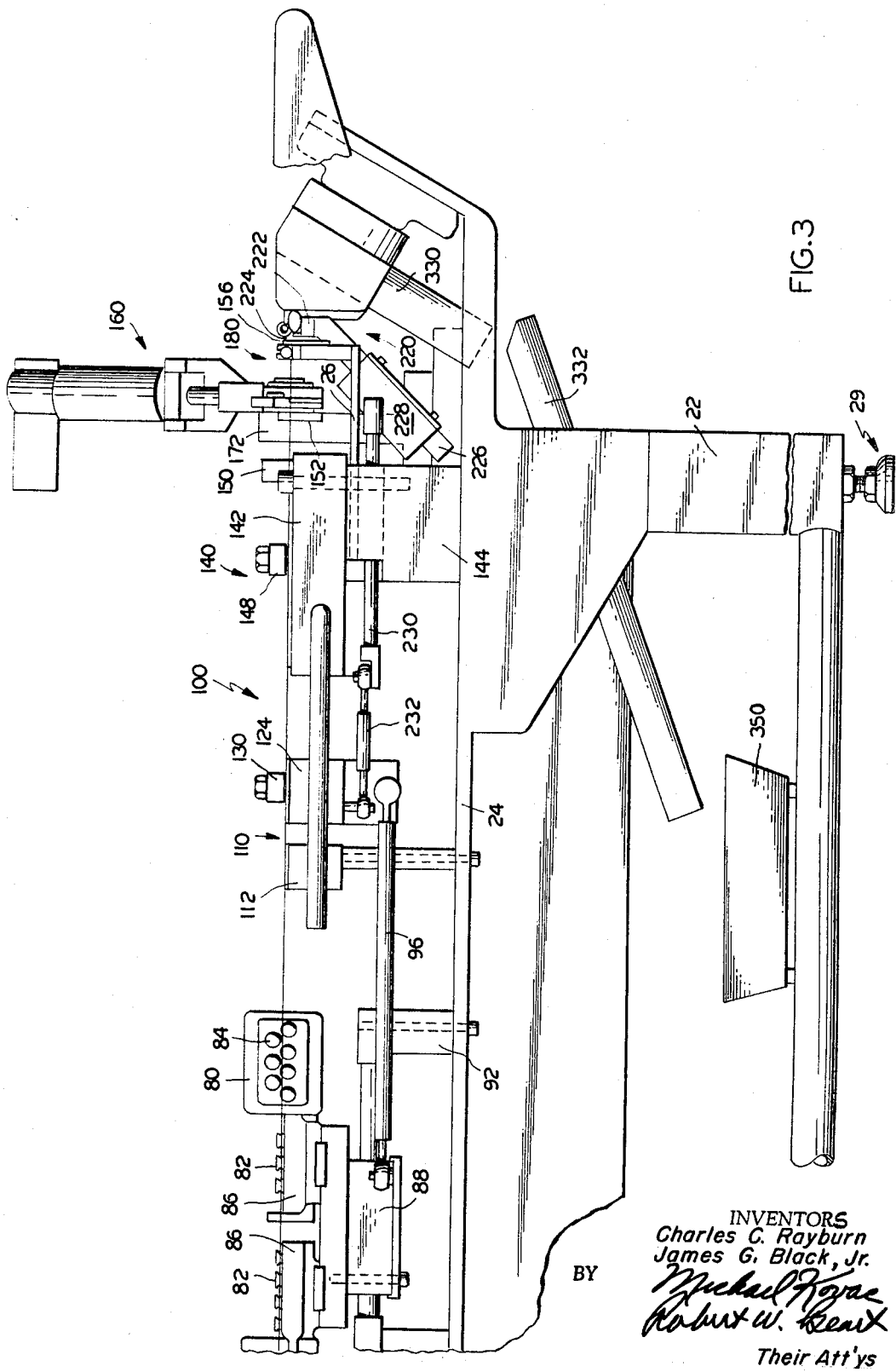
FIG. 3 is also a fragmentary side elevational view of a portion of the apparatus shown in FIG. 1, but viewed along the right side thereof.
Figure 4:
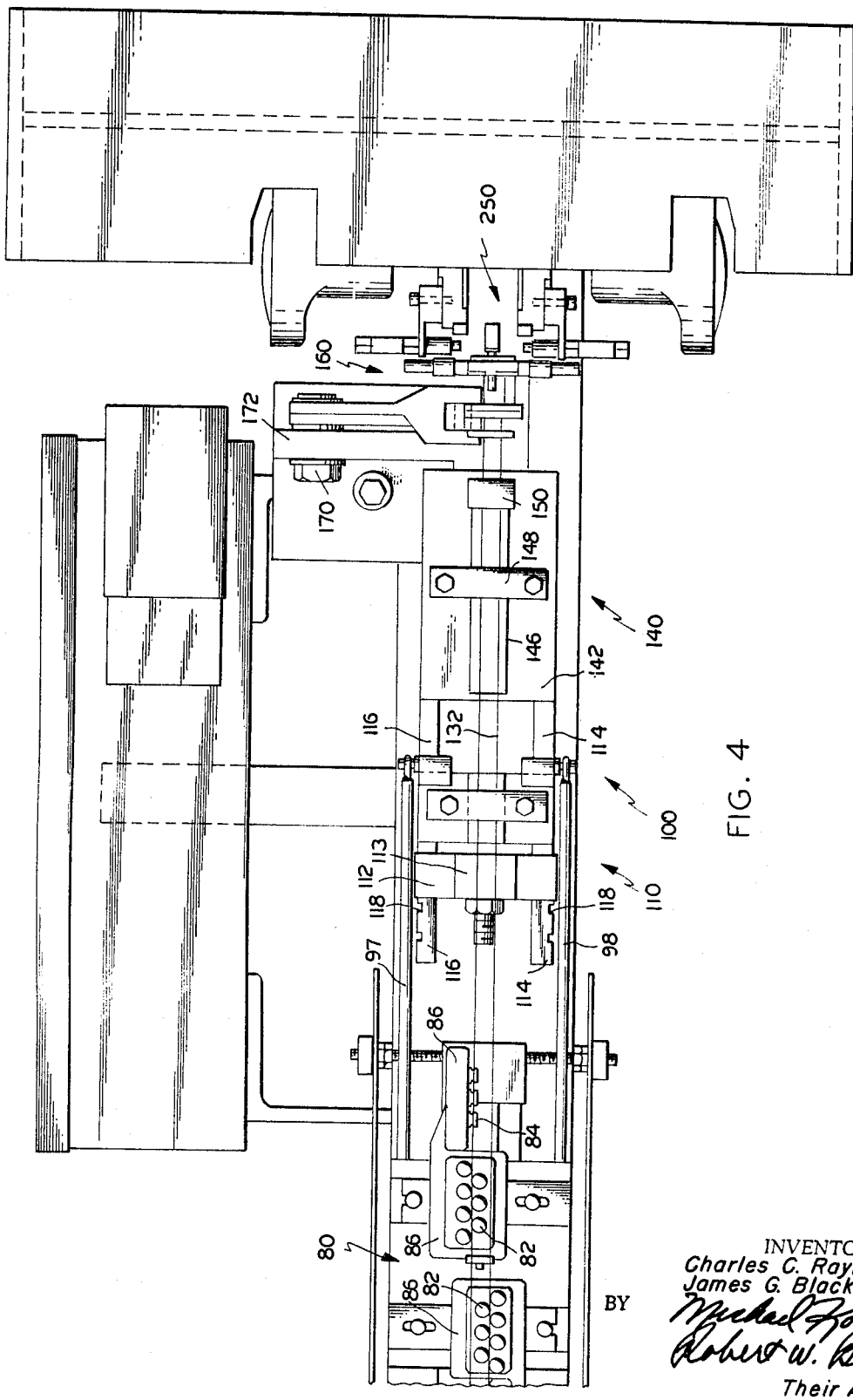
FIG. 4 is a fragmentary top plan view of the portion of the apparatus shown in FIG. 3.

Referring now to FIGS. 1, 3 and 4, the reciprocating feed carriage 100 is shown, and this carriage is subdivided into a feed clamp section 110 and a stock clamp section 140. The feed clamp section 110 is provided with an adjustable end block 112 which is fixedly mounted to, but adjustable on a pair of spaced bar members 114, 116 which are in turn mounted to the feed clamp housing 124. As best seen in FIG. 4, the bars 114, 116 have vertically disposed notches 118 formed therein which cooperate with a complementary lug portion provided on the attached plates 120 fixed to the adjustable end block 112 at various positions along the bars 114, 116. Movable feed clamp 122 has a pair of slotted support members 124 through which the bars or rods 114, 116 extend, and to which they are releasably secured. By adjusting the end block 112 and movable feed clamp 122 relative to each other, the amount of feeding increment can be varied.

Each of the slotted support blocks 124 has a depending flange 126 which serves as a convenient place to mount one end of the connecting link 96, the other end of which is connected to the movable ram carriage 88 as above described. Mounted between the pair of slotted support blocks 124 is a stock clamp plate 128 which is similar to the wear plate 113 of adjustable end block 112 in the sense that both are provided with grooves for receiving the wires 32, 34. A cover plate 130 is mounted to the top surfaces of the spaced slotted support blocks 124 in overlying relationship to the clamp plate 128. Suitable means (not shown) are provided to relatively advance the clamp plate 128 and cover plate 130 toward one another to clamp the wires 32, 34 thereto during certain periods of the feeding cycle as will be discussed hereafter.

The feed clamp section 110, including the adjustable end block 112 and the movable feed clamp 122 are moved in a reciprocatory fashion relative to the stock clamp housing 142 by the air piston 132 which extends partially through and its mounted to the stock clamp housing 142. The housing 142 is positioned above the supporting bed 24 by the supporting member 144 to which the housing 142 is suitably secured. In the upper surface of the housing 142, there is provided an elongated wear plate 146 having grooves similar to the wear plate 113 of the adjustable end block 112 and the clamp plate 128 of the movable feed clamp 122. A cover-clamping plate 148 spans the wear plate 146 and is mounted on opposite sides thereof to the housing 142. The cover-clamping plate 148 and the wear plate 146 are relatively advanced toward one another in the same manner as the clamping plate 128 and cover plate 130 so as to clamp the wires 32, 34 at or near the end of the forward stroke of the reciprocating feed carriage. A guide block 150 having suitable openings complementary to the grooves in the wear plate 146 is provided to maintain the wires in spaced and aligned relationship as they are moved through the apparatus.

The reciprocating feed carriage 100 is operated by a solenoid valve which is energized by suitable means to be described hereinafter for actuating the piston 132 which in turn reciprocates the feed clamp section 110 relative to the fixed stock clamp section 140. On the forward stroke of the carriage, that is, the movement of the carriage from left to right as viewed in FIG. 1, the clamp plate 128 and the cover plate 130 clamp the wires 32, 34 therebetween so that a predetermined length of wire is withdrawn from the spools 30 and transported past the cutter mechanism 160 to the assembly station 250. When the feed clamp section completes its forward stroke, the clamp plate 128 and the cover plate 130 are disengaged from the wires 32, 34, and the wear plate 146 and cover-clamping plate 148 of the stock clamp section 140 are then relatively advanced toward one another to engage and clamp the wires.

Figure 14:
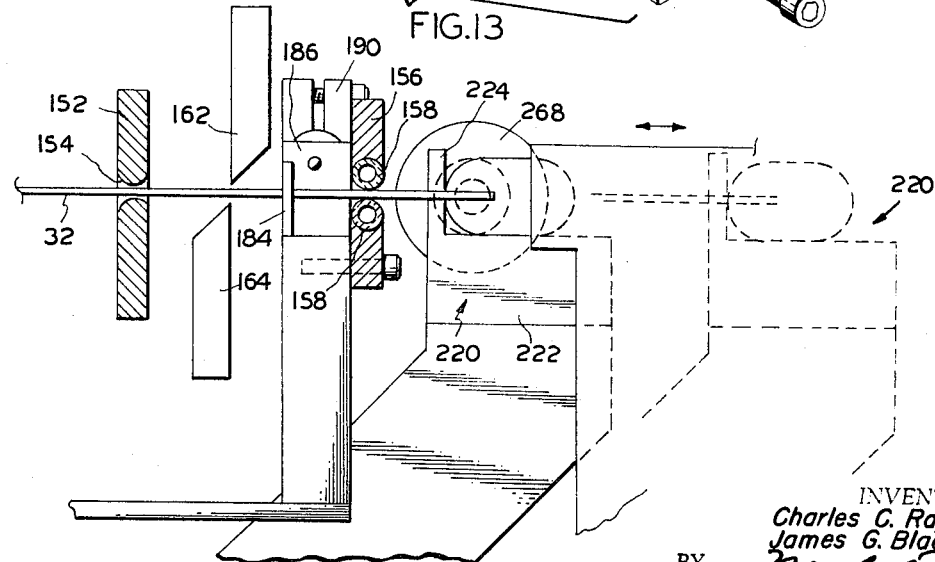
FIG. 14 is a semi-diagrammatic side view of the right hand portion of the apparatus shown in FIG. 1 just prior to severance of the lead wires, the phantom lines depicting the displacement of the capacitor body after attachment of the leads thereto.

From the guide block 150, the wires 32, 34 are directed through a rear wire guide 152 having suitable apertures 154, the innermost portions of which along the front face thereof are beveled to facilitate the introduction of the wires. The rear wire guide 152 is fixedly mounted to suitable support means and cooperates with the forward wire guide 156 which is supported by the wire spreader mechanism 180 as will be described hereafter. In the cutting operation, as best seen in FIG. 14, the rear and forward wire guide assemblies 152, 156 respectively hold the wires 32, 34 while the wires are being severed by the cutting mechanism 160. It is to be understood that the cutting mechanism 160 is operated after the forward end portions of the lead wires are assembled to the capacitor body, although if desired, the wire severance may take place before the cutting operation.

In order to maintain consistency in describing the apparatus as viewed from left to right in FIG. 1, reference is now made to FIGS. 1, 3–4 and 6 for a description of the cutter mechanism 160 and its operation. As readily depicted in FIG. 6, the wires 32, 34 are fed between upper and lower cutting blades 162, 164 respectively which are normally maintained in an open position. The upper and lower cutting blades 162, 164 are mounted on movable and fixed blade support arms 166, 168 respectively. A mounting pin 170 extends through both of the blades at one end thereof and attaches the same to an upright plate 172 suitably secured to the supporting bed 24 of the apparatus.

The blade support arm 168 is provided with an integral upstanding abutment 173 to which the yoke member 174 is suitably secured. The arms of the yoke 174 are pivotally mounted to collar 175 which in turn is attached to the air cylinder housing 176. Piston rod 177 is connected at its lower end to the blade support arm 166 which mounts the upper cutting blade.

When air is introduced within the cylinder housing 176, the piston drives the piston rod 177 to move the upper cutting blade 162 relative to the lower cutting blade 164 to sever the wires 32, 34. Since the blade support arm is pivotally mounted to the fixed upright support member 172 and the fixed collar support 175, it will remain in a stationary position during the cutting operation. Cutter mechanism 160 is actuated by a suitable air solenoid valve which is energized by control means to be discussed hereinafter.

As has been discussed previously, the forward end portions of the wires 32, 34 are positioned adjacent the extended foil of a convolutely wound capacitor and assembled thereto preferably before predetermined lead lengths are cut from the wires. For an explanation of the welding operation, reference is now made to FIGS. 8–12 which depict the various stages or sequences in the welding of lead wires to a capacitor blank.

In FIG. 8, the wires 32, 34 are shown as being positioned in diverging relationship to each other as they extend from the rear wire guide 152. The wires 32, 34 are initially fed through the rear wire guide 152, past the cutting mechanism 160 and thence through the forward wire guide 156 in predetermined paths which are substantially parallel to each other, the wires being separated in the manner shown in FIG. 8 only to permit loading of the capacitor 36 on the capacitor support 220.

Figure 13:
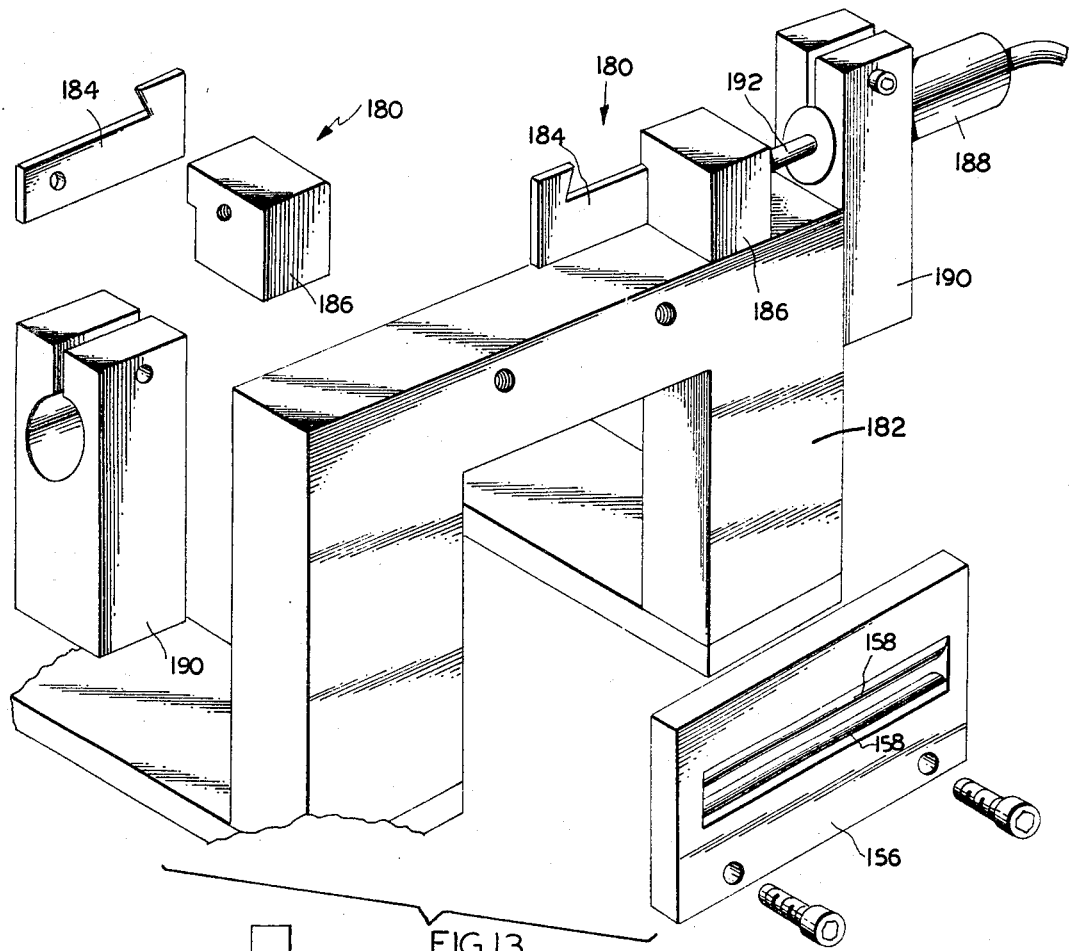
FIG. 13 is a partially exploded perspective view of the mechanism used in holding the elongated wire strips to facilitate the assembly thereof to a capacitor body or blank.

The wire spreader mechanisms 180 are used to separate the forward end portions of the wires 32, 34 in the manner shown in FIG. 8. Attention is directed to FIG. 13 which shows the constructional details of each wire spreader mechanism. A U-shaped mounting block 182 has the free extremities of its leg portions suitably connected to a pair of shelves 26 extending from the supporting block 144 on opposite sides of the apparatus. Resting atop the bight end portion of the U-shaped mounting block 182 are a pair of wire spreader mechanisms 180, each of which comprises an insulated wire gripper arm 184 which is attached to the gripper block 186. This assembly is mounted for reciprocatory movement across the upper surface of the U-shaped mounting block. A miniature air cylinder 188, which is supported by the cylinder mounting bracket 190 has its piston rod 192 connected to the gripper support block 196 so as to permit reciprocatory movement of each wire gripper arm 184 at a preselected time during the apparatus cycle. In particular, this movement is specifically designed to occur after each feeding increment of the wires 32, 34 which is sufficient to position the forward end portions of the wires adjacent the capacitor 36 when loaded in the apparatus as will be described hereafter.

As best seen in FIG. 13, the forward wire guide 156 is attached to the front side of the U-shaped mounting block. The forward wire guide 156 has a pair of glass insulator rods 158 cemented to marginal portions adjacent an opening provided therein in such a manner that the forward end portions of the wires 32, 34 are allowed to move only in a lateral or transverse direction relative to the capacitor 36.

After each feeding increment of the wires 32, 34, the air cylinder 188 associated with each wire gripper bar 184 is actuated by a solenoid valve arrangement to be discussed hereafter, thus separating the forward end portions of the wires from each other. A capacitor body or blank 36 can then be loaded upon the capacitor support 220 in the manner shown in FIG. 8.

Figure 11:
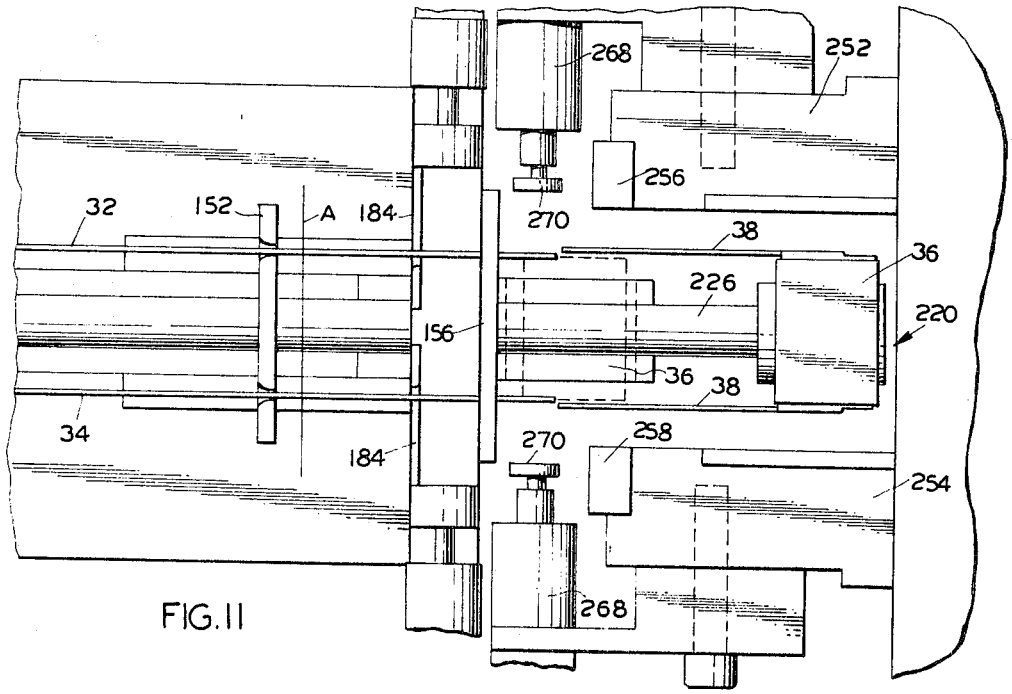

The capacitor support assembly 220 is shown in FIGS. 1, 3, 8–12 and 14, and is probably best illustrated in FIG. 3. The capacitor support has a base 222 and an upstanding flange 224 at one end of the base against which the capacitor body or blank rests. The manner in which the capacitor body or blank is positioned on the base 222 and against the upstanding flange 224 is best seen in FIGS. 9–11 of the drawings. An adjustable supporting extension 226 has its upper end secured to the lower end of base 222 and is adjustably mounted within the capacitor support mounting block 228. It is to be specifically noted that both the elongated member 226 and the mounting block 228 are inclined relative to the base 222, preferably at an angle of 45°. This arrangement will permit change in capacitor size without changing the center line location of the capacitor relative to the lead wires.

A linkage mechanism 230, 232 connects the capacitor support mounting block 228 with the slotted support blocks 124 of the reciprocating carriage feed clamp section 110. In this manner, the capacitor support assembly 220 is moved from a position adjacent the wire spreader mechanisms 180 to a capacitor tamping station 310, and then is moved to transport the completed article to the gravity feed chutes 330, 332 for movement to the product receiving tray 350. It is to be noted that the connecting link 230 extends through an opening in supporting member 114 just slightly larger than the diameter of the connecting link so as to prevent lateral travel of the capacitor support assembly in its movements. The shelves 26, which support the wire spreader mechanisms 180 also restrict lateral travel of the capacitor supporting block 228, and thus the other parts of the capacitor supporting assembly. When the capacitor bodies or blanks have been positioned on the base 222 and against the upstanding flange 224 of the capacitor supporting assembly as shown in FIG. 8, the forward end portions of wires 32, 34 may be attached to the extended foil of the capacitor bodies by percussive welding techniques now to be discussed.

With the forward end portions of the wires held in spaced relationship from each other by the wire spreader mechanisms 180, the capacitor body 36 is clamped in a fixed position on its support. This is accomplished by a pair of movable insulated jaw members 252, 254 which are relatively advanced toward one another by suitable means (shown diagrammatically by the arrows in FIG. 9). The insulated jaws 252, 254 are provided with electrode means 256, 258 respectively which are adapted to engage the extended metallic foils of the capacitor body 36 when the jaw members 252, 254 have been closed as is shown in FIG. 9 of the drawings. The lead wires 32, 34 are now ready to be assembled to the extended foils of the capacitor 36.

Attached to the insulated jaw members 252, 254 along the outer surfaces thereof are hammer cylinder brackets 260, 262 respectively having supporting arms 264, 266 which mount hammer cylinders 268, 268 in mirror image relationship to each other. Each hammer cylinder 268 has a hammer head 270 extending from its piston rod 269 which is adapted to engage the forward end portion of a lead wire and move it relative to one of the extended foils of the capacitor body. The movement of the hammer heads 270 so as to contact and impell the lead wires 32, 34 into impacting relationship with the extended foils of the capacitor body 36 is shown in FIG. 10 of the drawings.

As the forward end portions of the wires 32, 34 are advanced relative to the extended foil of the capacitor body, an electrical arc is established between each lead wire and the extended foils to which it is to be attached preferably by the discharge of a capacitor bank as will be discussed in detail hereafter. The electrical arcs established are of such magnitude that they heat up the participating surfaces so that when impacted against each other by the hammer heads 270, a weld takes place.

Figure 6:
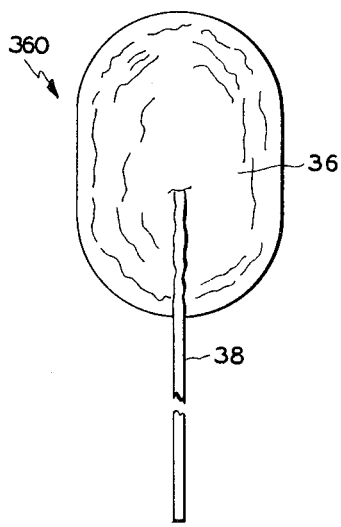
FIG. 6 is a fragmentary side elevational view of a capacitor produced by the method and apparatus of the present invention.
Figure 7:
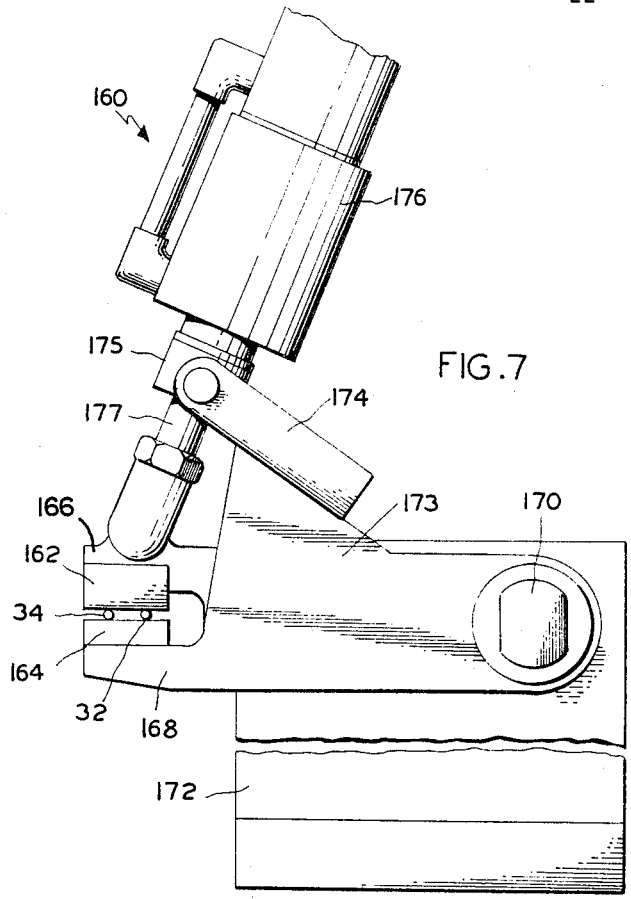
FIG. 7 is a fragmentary side elevational view of the cutter mechanism which is used to sever predetermined lengths of wire from elongated wire strips fed through the apparatus shown in FIG. 1.

As seen in FIG. 6 of the drawings, and as described in detail in copending application Ser. No. 435,925, filed Mar. 1, 1965, entitled Wound Capacitor and Lead Assembly, each turn of the capacitor foil is welded at least in one spot to the lead wire. The lead strength is more than adequate to survive a subsequent coating process. The structural and functional advantages obtained by this particular arrangement are disclosed and claimed in the above mentioned copending application.

Returning now to the description of the welding operation, once the forward end portions of the lead wires 32, 34 have been assembled in the manner described above and as shown in FIG. 10, the cutter mechanism 160 can be actuated by means to be described hereafter.

Figure 12:
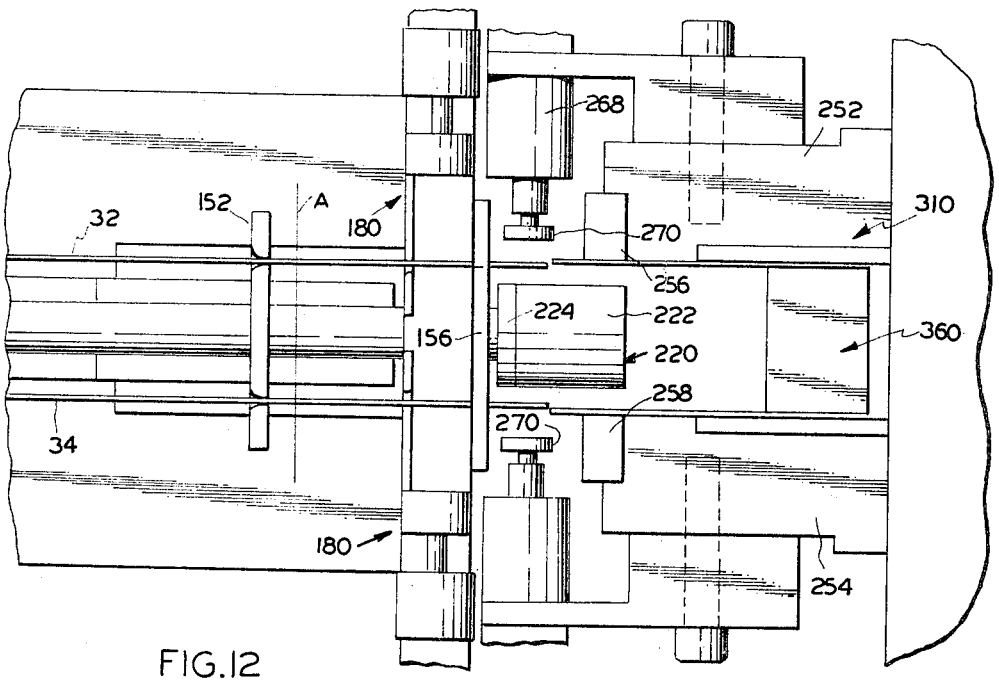

The severance of the wires along cutting plane A is shown in FIG. 11 of the drawings, after the termination of which, the insulated jaws 252, 254 open and the wire gripper hooks 184 extend allowing the leads 28 to spring back and free the capacitor for indexing by the capacitor support assembly 220 along with the reciprocating feed carriage 100 as shown in FIG. 12 of the drawings. It will be noted as shown in FIG. 11 that as the capacitor with its assembled leads is moved away from the welding station, the wires 32, 34 are incrementally advanced simultaneously therewith. This is due, as above described, to the attachment of the capacitor supporting assembly 220 and the reciprocating feed carriage 100 so that the carriage 100 moves back and forth, the capacitor supporting assembly 220 is moved along therewith.

The final step in the assembly operation is the tamping of the foils surrounding the attached leads as shown in FIG. 12 by the reactuation of the insulated jaws 252, 254 at the end of the wire indexing movement. This tamping operation presses the foils surrounding the attached leads generally flat to improved uniformity of appearance of the capacitor when its subsequently coated. The tamping operation has no noticeable effect on the mechanical or electrical characteristics of the joint.

As the insulator jaws 252, 254 are moved toward each other to tamp the capacitor foils, the capacitor supporting assembly 220 is retracted as the reciprocating feed carriage 100 moves on its return stroke. Thus, when the insulated jaws are opened after the tamping operation, the capacitor will be free to fall within the gravity feed chutes 330, 332 (see FIG. 3) which will transfer the same to the product receiving tray 350.

Figure 15:
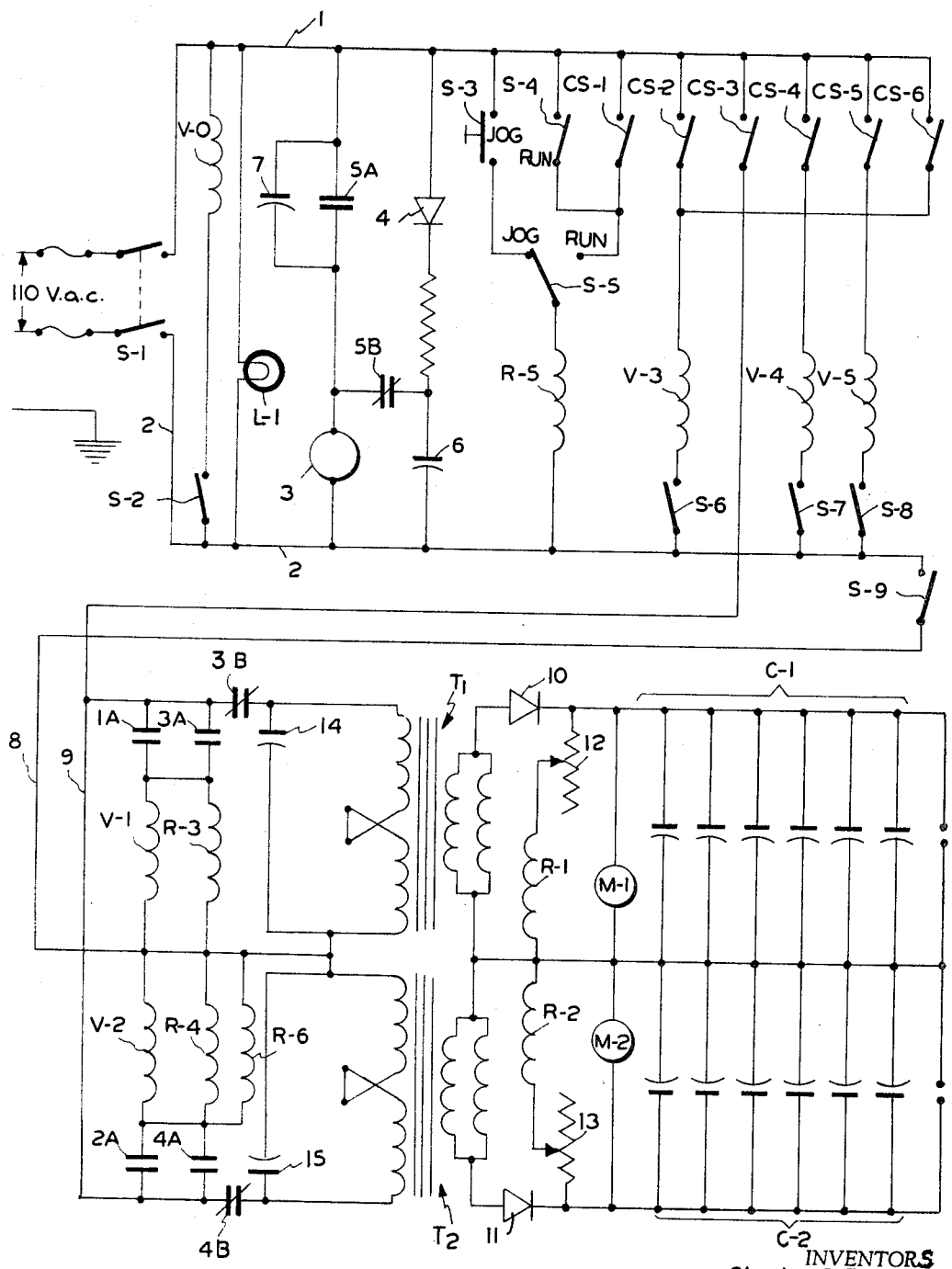
FIG. 15 is a schematic wiring diagram of the welding circuit utilized in the present invention.

The apparatus is cycled by a control circuit such as shown in FIG. 15 of the drawings. A power supply of 110 volts A.C. is established across leads 1, 2 upon the closure of switch S–1. A separate manually controlled switch S–2 operates main solenoid valve V–0 which establishes air or other fluid supply to the solenoid valves designated V–1 through V–5 in operating the various components of the machine. The closure of main switch S–1 can be visually determined by the operator in the illumination of lamp L–1 connected across leads 1,2. The machine can be operated through a "jog" or "run" cycle by the closure of switch S–3 or S–4, the positioning of switch S–5 in its "jog" or "run" position, and the closure of switch S–6 through S–9.

In operating the machine through its "run" cycle, switch S–4, which is preferably a foot switch, is actuated after after switch S–5 is placed in its "run" and switches S–6 through S–9 have been closed. This will energize relay R–5 which will in turn complete a circuit through its contacts 5a, 5b respectively to operate the timing motor 3. Rectifier 4 connected in circuit therewith changes the current to D.C. and directs it through the resistor 5 and timing motor 3. Capacitor shunts 6, 7 are connected across the timing motor 3 and normally open contact 5a of relay R–5 to prevent damage to the motor when the power supply is shut down.

The energization of timing motor 3 causes it to run through one revolution to actuate the various cam switches designated CS–1 through CS–6. Each of the cam switches are opened and closed at predetermined time intervals during the cycle so as to operate solenoid valves V–1 through V–5 which in turn actuate such apparatus components as the reciprocating feed carriage 100, the cutter mechanism 160, the wire spreader mechanism 180 the insulator jaws 252, 254 and the hammer heads 272.

Timing motor 3 is energized and de-energized by CS–1 at the beginning and the end of the apparatus cycle. When the timing motor begins its cycle, CS–2 will be closed to energize the solenoid valve V–3 which is used to bring the insulator jaws 252, 254 in position for clamping a capacitor bank. Cam switch CS–3, when closed, will start the capacitor banks C–1 and C–2 charging in the following manner: Cam switch CS–3 and switch S–9 complete a circuit through leads 8, 9 so as to apply power to the transformers T–1, T–2. The secondary current from the transformers T–1, T–2 is rectified by rectifiers 10, 11 so as to charge the capacitor banks C–1, C–2 respectively with D.C. current. When a preset voltage is attained, the capacitor banks C–1 and C–2 are discharged to energize the solenoid valves V–1 and V–2 which in turn will operate the hammer heads 270 in percussively welding lead wires to the extended foil of a convolutely wound capacitor.

The voltage across capacitor banks C–1 and C–2 can be visually determined by meters M–1 and M–2 connected thereacross. The voltage across each capacitor bank is divided between a rheostat and a relay coil. In the case of capacitor bank C–1, the voltage is divided between rheostat 12 and relay coil R–1 whereas in capacitor bank C–2, the voltage is divided between rheostat 13 and relay coil R–2.

When the voltage rises sufficiently across rheostats 12, 13, the relays R–1 and R–2 energize and they in turn discharge the capacitor banks to lock up the hammer valve V–1 and V–2 until CS–3 opens at the conclusion of the weld.

The relays R–1 and R–2 complete circuits through contacts 1a, 3a and 3b, and 2a, 4a and 4b so as to energize soleniod valves V–1 and V–2 as well as relays R–3, R–4 and the counting mechanism R–6. The energization of valves V–1 and V–2 will operate the hammer heads 270, and at the same time discharge the capacitor banks C–1 and C–2 furnishing the electrical arcs for the welds. Capacitors 14, 15 are shunted across transformers T–1, T–2 respectively, to prevent damage thereto upon sudden opening of cam switch CS–3. Cam switches CS–4 through CS–6 are designed to operate the cutter mechanism 160, the reciprocating feed carriage 100 and the insulator jaws 252, 254 respectively through the energizing of solenoid valves V–3 through V–5.

Thus, during one revolution of the timing motor 3, the various moving parts of the apparatus are operated to percussively weld lead wires to a capacitor body or blank and at the termination of this, cam switch CS–1 opens to stop the timing motor. Thereafter, it is necessary to depress switch S–4 again in order to send the apparatus through its cycle.

OPERATION

Referring now to FIGS. 8–12 and 15, there will be given a description of the various steps performed and their sequence during the cycling of the apparatus. Upon the closing of switch S–4, the timing motor 3 will be energized and will in turn control the opening and closing of cam switches CS–1 through CS–6 which are shown in the electrical circuit of FIG. 15, and which in turn operate the various solenoid valves V–1 through V–5. Assuming that the forward end portion of the lead wires 32, 34 have already been fed adjacent the capacitor support 220, the wire spreader mechanisms 180 are operated from the solenoid valve which operates the reciprocating feed carriage so that they are inactive when the carriage is travelling forward, and become active by a spring loading arrangement (not shown) contained within the cylinders 188 when the fluid supply is cut off of the feed carriage for pulling apart the wires 32, 34. This will cause the forward end portions of the wires to diverge away from each other as shown in FIG. 8 so as to receive a capacitor bank 36 in position on the capacitor supporting assembly 220. The switch S–4 is then operated. This will energize timing motor 3 to cause opening and closing of cam switches CS–1 through CS–6 in controlling the various parts of the apparatus. As has been explained above, CS–1 regulates the starting and stopping of timing motor 3. While CS–1 is closed, switch CS–2 closes to energize solenoid valve V–3 and thus the jaws 252, 254 in clamping the capacitor on its supporting assembly 220. This step is shown in FIG. 9 of the drawings.

With the capacitor clamped in position, switch CS–3 closes to start the charging of capacitor banks CS–1 and CS-2 which, after a predetermined voltage has been reached, energize relays R-1 and R-2 to operate solenoid valves V-1 and V-2 which move the hammer heads 270 against the forward end portions of the lead wires 32, 34 so as to drive them in impacting relationship against corresponding extended foil edges of the capacitor blank while the capacitor banks CS-1 and CS-2 are being discharged so as to obtain a percussive weld between the lead wires and the extended foil of the capacitor bank as is shown in FIG. 10 of the drawings.

Upon the completion of the welding operation, the jaws 252, 254, the hammer heads 270, and the spreader mechanisms 180 are moved out of engagement with the capacitor body and the lead wires while the cutting mechanism 160 is operated to sever predetermined lead lengths 38 from lead wires 32, 34 as is shown in FIG. 11 of the drawings. Cam switches CS-2 through CS-4 are actuated during this portion of the operation.

As the severing operation is being completed, cam switch CS-5 is closed to energize solenoid valve V-5 for moving the reciprocating feed carriage 100 which in turn operates the capacitor supporting assembly 220 to simultaneously feed new lengths of wire to the welding station while moving the just operated on capacitor with its attached leads to the tamping station 310. Cam switch CS-6 then closes to again energize solenoid valve V-3 so as to move jaws 252, 254 in position for tamping the foil edges surrounding the attached leads. As the tamping operation is being performed, cam switch CS-5 opens to de-energize solenoid valves V-5 and cause retraction of the reciprocating feed carriage 100 and the associated capacitor support assembly 220. At the conclusion of the tamping operation, cam switch CS-6 opens to de-energize solenoid valve V-3 permitting the capacitor with its attached leads to fall within gravity chutes 330, 332 where it is transported to the product receiving tray 350. The above described cycle is then repeated for as many capacitors as are desired.

From the foregoing, it will be appreciated that the present invention contemplates a novel method and apparatus for rapidly and efficiently assembling lead wires to the extended foil of a convolutely wound capacitor blank. The movement and disposition of the lead wires relative to the capacitor blank, the use of a modified percussive welding technique to attach the lead wires to the capacitor blank, the severance of the lead wires, and the movement of the completed capacitor to a product receiving station is all part of a highly mechanized system as will now be apparent.

While specific embodiments of the invention have been shown and described, it is with full awareness that many modifications thereof are possible. The invention therefore, is not to be restricted except insofar as is necessary by the prior art and by the spirit of the appended claims.

We claim:

1. Apparatus for assembling at least a pair of lead wires to the exposed metallic edges at opposite ends of a convolutely wound metallic film capacitor comprising, means for supporting a convolutely wound capacitor blank at an assembly station, said supporting means comprising a base and an upstanding flange against which each capacitor blank is positioned, and means for adjusting said base and upstanding flange relative to said elongated wires for accommodating capacitors of different size, means for intermittently feeding at least a pair of spaced elongated wires along predetermined paths to the assembly station, the end portion of each elongated wire being positioned in transverse and spaced relationship to one of the exposed metallic edges at the termination of each feeding increment, means for moving the end portion of each lead wire toward and into contact with one of the exposed metallic edges and simultaneously impressing a welding voltage between the end portions of each lead wire and the exposed metallic edge with which it is to be associated prior to engagement thereof so as to percussively weld the lead wires to the exposed metallic edges of the capacitor blank when impacted against each other, and means for severing lead wires of predetermined length from the elongated wires.

2. The apparatus set forth in claim 1 wherein said last mentioned means is adapted to move said base and flange at a 45° angle relative to the plane of the elongated wires while maintaining the base parallel to the plane of the wires to permit variation in capacitor size without changing the center line location thereof.

3. The apparatus set forth in claim 1 wherein said means for intermittently feeding said spaced elongated wires includes a reciprocating stock feed having means for grasping each wire at the beginning of its forward stroke for feeding predetermined lengths thereof and for disengaging from each wire after said predetermined lengths of wire have been fed.

4. The apparatus set forth in claim 3 including means for supporting each elongated wire on opposite sides of the severing means during severing to aid in cutting a predetermined lead length from each elongated wire.

5. The apparatus set forth in claim 3 including means associated with the reciprocating stock feed to reduce the effect of variable tension introduced into each wire during the feed thereof.

6. The apparatus set forth in claim 1 wherein the means for supporting the capacitor blank and the means for intermittently feeding the elongated wires are attached to each other to provide simultaneous movement thereof.

7. Apparatus for percussively welding leads to the exposed metallic edge surfaces of a convolutely wound metallic film capacitor blank comprising, means for supporting a convolutely wound capacitor blank at an assembly station, means for incrementally feeding a pair of elongated wire strips along spaced predetermined paths extending transverse to the exposed metallic edge surfaces of the capacitor blank, each incremental movement of the feeding means positioning the terminal portion of each wire strip adjacent at least a portion of one exposed metallic edge surface of said capacitor blank, means for clamping said capacitor blank along portions of each exposed metallic edge surface spaced from the portion aligned with the terminal portion of each wire strip, means for holding each wire strip while permitting deflection thereof in a plane transverse to the exposed metallic edge surfaces, means for moving the terminal portion of each wire strip toward the aligned portion of one of said exposed metallic edge surfaces for engagement therewith, and means for impressing a welding current across each lead wire and its respective metallic edge surface just prior to impacting of said lead wires to cause an intense discharge of electrical energy therebetween in order to fuse each lead wire and edge surface as they are impacted against each other, whereby the fused portions of each lead wire are arranged in a plane traversing the longitudinal axis of the convolutely wound capacitor.

8. The method of percussively welding a lead wire to a convolutely rolled capacitor having the edge surface of a thin metal foil extending beyond the corresponding edge surface of insulation means, comprising the steps of supporting a capacitor body with the metallic edge surface of the foil exposed, engaging one portion of the metallic edge surface with a clamping member, intermittently feeding and disposing a lead wire transversely to the axis of the capacitor body with an end portion thereof spaced from said clamping member and from said metallic edge surface, and simultaneously moving the end portion of the lead wire toward said edge surface while impressing a welding voltage therebetween to cause an intense discharge of electrical energy between said lead wire and said edge surface slightly before the impacting of the lead wire with said edge surface to heat the participating surfaces above the melting point of the metals as they approach each other so as to cause a percussive welding thereof as they are impacted against each other.

9. The apparatus set forth in claim 1 wherein said means for moving comprises an adjustable drive member for controlling the rate of impact of the lead wire relative to the exposed metallic edge for governing the amount of heat generated during welding.

10. The method of claim 8 wherein the rate at which the end portion of the lead wire is moved toward the edge surface is variable for governing the amount of heat generated during welding.

References Cited
UNITED STATES PATENTS

| | | | |
|---|---|---|---|
| 3,156,966 | 11/1964 | Houda et al. | 29—33 |
| 3,292,233 | 12/1966 | Black et al. | 29—25.42 |
| Re. 17,949 | 2/1931 | Chubb. | |
| 2,798,936 | 7/1957 | Quinlan. | |
| 2,807,707 | 9/1957 | Birchler. | |
| 2,809,274 | 10/1957 | Quinlan. | |
| 2,843,724 | 7/1958 | De Gaeta. | |
| 2,874,264 | 2/1959 | Quinlan. | |
| 2,921,177 | 1/1960 | Gellatly. | |
| 2,967,229 | 1/1961 | Chuma. | |
| 2,986,625 | 5/1961 | Houda. | |
| 3,067,488 | 12/1962 | Bennett et al. | |
| 3,073,007 | 1/1963 | Rubinstein. | |
| 3,117,364 | 1/1964 | Black. | |
| 3,146,334 | 8/1964 | Kinser. | |

RICHARD M. WOOD, *Primary Examiner.*

C. CHADD, *Assistant Examiner.*